United States Patent [19]

Muro et al.

[11] Patent Number: 5,059,487
[45] Date of Patent: Oct. 22, 1991

[54] HOT-MELT ADHESIVE COMPOSITION

[75] Inventors: Tsuneaki Muro; Masami Takeda, both of Waki, Japan

[73] Assignee: Mitsui Petrochemical Industries, Ltd., Tokyo, Japan

[21] Appl. No.: 647,972

[22] Filed: Jan. 30, 1991

[30] Foreign Application Priority Data

Jan. 30, 1990 [JP] Japan ................................ 1-17723

[51] Int. Cl.$^5$ .................. B32B 27/28; C08L 53/02; C08L 45/00; C08L 23/08; C08L 9/06
[52] U.S. Cl. ...................................... 428/500; 525/97; 525/210; 525/216; 428/483; 428/516
[58] Field of Search .................... 525/216, 210, 97; 428/500

[56] References Cited

U.S. PATENT DOCUMENTS

| 4,533,700 | 8/1985 | Mizui et al. | 525/97 |
| 4,874,808 | 10/1989 | Minami et al. | 525/210 |
| 4,918,133 | 4/1990 | Moriza et al. | 525/210 |
| 4,983,674 | 1/1991 | Shigemoto et al. | 525/97 |
| 4,990,559 | 2/1991 | Shiraki et al. | 525/210 |
| 4,992,511 | 2/1991 | Yamamoto et al. | 525/97 |

Primary Examiner—Carman J. Seccuro
Attorney, Agent, or Firm—Sherman and Shalloway

[57] ABSTRACT

Disclosed is a hot-melt adhesive composition comprising (a) 20 to 70 parts by weight of a vinyl aromatic compound/conjugated diene copolymer or a hydrogenation product thereof, (b) 30 to 80 parts by weight of an alicyclic hydrocarbon resin tackifier, the total amount of the components (a) and (b) being 100 parts by weight, and (c) 0.3 to 20 parts by weight of a random copolymer of a cyclic olefin and ethylene.

11 Claims, No Drawings

HOT-MELT ADHESIVE COMPOSITION

BACKGROUND OF THE INVENTION (1) Field of the Invention

The present invention relates to a hot-melt adhesive composition. More particularly, the present invention relates to a hot melt adhesive composition having an excellent adhesiveness even at a high temperature. Furthermore, the present invention relates to a sticking structure such as an adhesive tape or sticking label, formed by using this hot-melt adhesive composition.

(2) Description of the Related Art

An EVA type adhesive composition comprising polyvinyl acetate or an ethylene/vinyl acetate copolymer (EVA) as the base has been mainly used as the hot-melt adhesive for a label, a kraft tape, a cloth tape and the like.

Furthermore, a hot-melt adhesive composition comprising (a) a styrene/aliphatic diene block copolymer and (b) an alicyclic hydrocarbon resin tackifier is recently used.

The EVA type hot-melt adhesive composition is defective in that the adhesiveness to polyethylene, polypropylene, polyethylene terephthalate, urethane, ABS, polyvinyl chloride and 4-methylpentene-1 polymer is low and the adhesiveness is drastically reduced at a high temperature.

The hot melt adhesive composition comprising a styrene/aliphatic diene block copolymer and an alicyclic hydrocarbon resin tackifier shows an excellent adhesiveness at a low temperature, but when the adhesive composition is used under heating or in an high-humidity atmosphere in hot water or in an electronic range, the adhesiveness is degraded.

SUMMARY OF THE INVENTION

It is a primary object of the present invention to provide a hot-melt adhesive composition having an excellent adhesiveness not only at a low temperature but also when heated at a high temperature or used in a high-humidity atmosphere.

Another object of the present invention is to provide a sticking structure such as an adhesive tape or a label from this excellent hot-melt adhesive composition.

The present invention has now been completed based on the finding that if a vinyl aromatic compound/conjugated diene copolymer is blended with an olefin type random copolymer having a compatibility with the vinyl aromatic compound/conjugated diene copolymer, an excellent adhesiveness can be maintained in the hot-melt adhesive composition even at a high temperature.

More specifically, in accordance with the present invention, there is provided a hot-melt adhesive composition comprising (a) 20 to 70 parts by weight of a vinyl aromatic compound/conjugated diene copolymer or a hydrogenation product thereof, (b) 30 to 80 parts by weight of an alicyclic hydrocarbon resin tackifier, the total amount of the components (a) and (b) being 100 parts by weight, and (c) 0.3 to 20 parts by weight of a random copolymer of a cyclic olefin and ethylene.

Preferably, the cyclic olefin used for the random copolymer (c) is a member selected from the group consisting of compounds represented by the following formula (I):

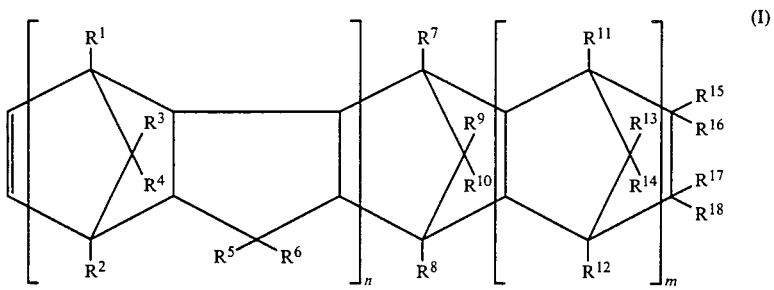

wherein
n is 0 or 1, m is 0 or a positive integer, $R^1$ through $R^{18}$ independently represent a hydrogen atom, a halogen atom or a hydrocarbon group, $R^{15}$ through $R^{18}$ may be bonded together to form a monocyclic or polycyclic group, the molycyclic or polycyclic group, the molycyclic or polycyclic group may have a double bond, and $R^{15}$ and $R^{16}$ or $R^{17}$ and $R^{18}$ may form an alkylidene group, compounds represented by the following formula (II):

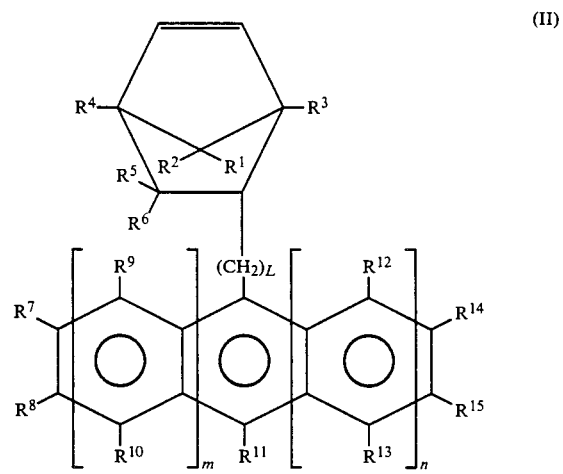

wherein
L is 0 or an integer of at least 1, m and n represent 0, 1 or 2, $R^1$ through $R^{15}$ independently represent a hydrogen atom, a halogen atom, an aliphatic hydrocarbon group, an aromatic hydrocarbon group or an alkoxy group, and $R^5$ (or $R^6$) and $R^9$ (or $R^7$) may be bonded together through an alkylene group or directly without any intervening group, and compounds represented by the following formula (III):

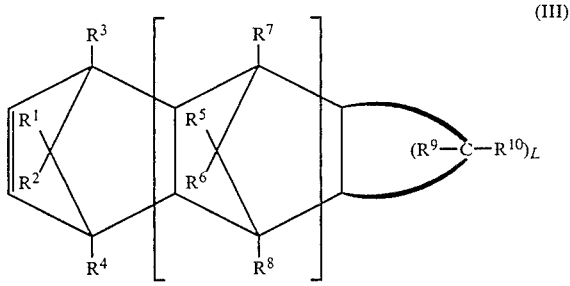

(III)

wherein
m is a positive integer, L is an integer of at least 3, and R¹ through R¹⁰ independently represent a hydrogen atom, a halogen atom or a hydrocarbon group.

DETAILED DESCRIPTION OF THE PREFERRED EMBODIMENTS

According to the present invention, in order to obtain an excellent adhesiveness at a high temperature, it is important that a cyclic olefin type random copolymer, which is a resin having a relatively high glass transition temperature, should be used.

For example, as is apparent from the results obtained in examples given hereinafter, in case of a hot-melt adhesive composition free of a cyclic olefin type random copolymer (Comparative Example 1), when a certain load is imposed on one of films bonded by heat sealing, the temperature is elevated at a rate of 25° C./hour and the temperature at which one film slips down is measured, it is seen that the measured temperature, that is, the shear adhesion failure temperature, is about 60° C. and the adhesive composition is not excellent in the adhesiveness at a high temperature.

In contrast, in the hot-melt adhesive composition of the present invention comprising a cyclic olefin type random copolymer (Example 1), the shear adhesion failure temperature is about 90° C., and it is seen that this composition is highly improved over the above-mentioned comparative composition in the adhesiveness at a high temperature.

Since the hot-melt adhesive composition of the present invention comprises a cyclic olefin type random copolymer, the composition of the present invention has an excellent adhesiveness even in a high-humidity atmosphere, for example, when used in hot water. The adhesive composition has an especially excellent adhesiveness to such adherends as polyethylene, polypropylene, polyethylene terephthalate, urethane, ABS and polyvinyl chloride.

The present invention will not be described in detail.

(a) Copolymer of Vinyl Aromatic Compound and Conjugated Diene and Hydrogenation Product Thereof As the copolymer (a) used in the present invention, there can be mentioned linear, radial and branched block copolymers and random copolymers composed of a vinyl aromatic compound and a conjugated diene.

As the vinyl aromatic compound, there can be mentioned styrene, α-methylstryrene, vinyltoluene, p-tert-butylstyrene, vinylxylene, ethylvinylxylene, vinylnaphthalene and mixtures thereof. Among them, styrene is especially preferably used.

As the conjugated diene, there can be mentioned 1,3-butadiene, isoprene, 1,3-pentadiene, 2,3-dimethylbutadiene, halogenated derivatives thereof and mixtures thereof. Among them, butadiene, isoperene and a combination of conjugated diene compounds composed mainly of butadiene or isoprene are preferably used, and butadiene and isoprene are especially preferably used.

As the vinyl aromatic compound/conjugated diene block copolymer, there can be mentioned, for example, block copolymers disclosed in Japanese Unexamined Patent Publication No. 52-150457 and Japanese Unexamined Patent Publication No. 53-71158. Supposing that (X) and (X¹) represent a vinyl aromatic compound block (X and X¹ may be the same or different) and (Y) represents a conjugated diene compound block, there can be mentioned block copolymers having a structure of X—Y—X¹ or X—Y, and a block copolymer having a structure of X(Y—X—Y)$_n$X or X(Y—X)$_n$Y in which n is an integer of from 1 to 10. In these block copolymers, the terminal block is preferably a vinyl aromatic compound block.

The number average molecular weight of the block copolymer is preferably 10,000 to 1,000,000 and especially preferably 20,000 to 300,000. The average molecular weight of each of the blocks composed of the vinyl aromatic compound is preferably 1,000 to 500,000 and especially preferably 2,000 to 300,000, and the average molecular weight of each of the blocks composed of the conjugated diene compound is preferably 1,000 to 500,000 and especially preferably 2,000 to 300,000.

The vinyl aromatic compound/conjugated diene compound weight ratio in the above-mentioned block copolymer is preferably in the range of from 2/98 to 60/40 and especially preferably in the range of from 10/90 to 40/60.

In the present invention, a hydrogenation product of the above-mentioned copolymer can be used.

As the hydrogenated vinyl aromatic compound/conjugated diene copolymer, a hydrogenation product in which at least 90% of the aliphatic double bonds contained in the copolymer are hydrogenated and up to 10% of the aromatic double bonds are hydrogenated is preferably used, and a hydrogenation product in which at least 99% of the aliphatic double bonds are hydrogenated and up to 5% of the aromatic double bonds are hydrogenated is especially preferably used.

Processes known to those skilled in the art can be adopted for the hydrogenation. As the hydrogenation catalyst to be used for hydrogenating the vinyl aromatic compound/conjugated diene copolymer, there can be mentioned, for example, nickel supported on porous diatomeceous earth, Raney nickel, copper dichromate and molybdenum sulfide, and platinum or palladium supported on a carrier such as carbon. The hydrogenation can be carried out under optional temperature and pressure conditions. For example, the hydrogenation reaction is carried out under a pressure of from atmospheric pressure to 300 atmospheres, especially 5 to 200 atmospheres, at a temperature of 24 to 320° C. for 0.1 to 24 hours, preferable 0.2 to 10 hours.

As specific examples of the vinyl aromatic compound/conjugated diene copolymer, there can be mentioned a styrene/isoprene random copolymer, a styrene/butadiene random copolymer, a butadiene/styrene block copolymer, a styrene/isoprene block copolymer, and an α-methylstyrene/butadiene/α-methylstyrene block copolymer. These copolymers are commercially available, and also hydrogenation products are marketed. As the commercially available product, there can be mentioned, for example, Cariflex TR-1101, TR-1107 and TR-4113 (supplied by Shell Chemicals), Kraton G-6500, G-6521, G-1650 and G-1657 (supplied by Shell Chemicals), and Solprene and hydrogenated Solprene (supplied by Philips Petroleum).

Incidentally, in the present invention, a mixture of two or more of the foregoing copolymers and hydrogenated copolymers can be used.

(b) Alicyclic Hydrocarbon Resin Tackifier

As the alicyclic hydrocarbon tackifier, there can be used an alicyclic hydrocarbon-containing petroleum resin, a hydrogenated aromatic petroleum resin, a natural terpene resin, an esterified rosin and derivatives thereof. It is preferred that the softening point of the tackifier be in the range of 80° to 140° C. If the softening point is lawer than 80° C., the heat resistance of the hot-melt adhesive composition is degraded, and if the softening point is higher than 140° C., the viscosity of the hot-melt adhesive composition increases and the operation adaptability is degraded. As a specific example of the alicyclic hydrocarbon resin used in the present invention, there can be mentioned Arkon P-100 (supplied by Arakawa Kagaku)

(c) Cyclic Olefin Type Random Copolymer

As the cyclic olefin type random copolymer, there can be mentioned, for example, a random copolymer disclosed in Japanese Unexamined Patent Publication No. 61-272216, and a random copolymer composed of a cyclic olefin and ethylene can be mentioned. As the cyclic olefin, there can be mentioned those having structures represented by the above-mentioned general formulae (I), (II) and (III).

Cyclic olefins represented by the general formula (I) can be easily prepared by condensing cyclopentadienes with corresponding olefins by Diels-Alder reaction. As the cyclic olefin represented by the general formula (I) in which n is 1, there can be mentioned compounds shown in Table 1, and as the cyclic olefin represented by the general formula (I) where n is 0, there can be mentioned octahydronaphthalenes such as 1,4,5,8-dimethano-1,2,3,4,4a,5,8,8a-octahydronaphthalene, 2-methyl-1,4,5,8-dimethano-1,2,3,4,4a,5,8,8a-octahydronaphthalene, 2-ethyl-1,4,5,8-dimethano-1,2,3,4,4a,5,8,8a-octahydronaphthalene, 2-propyl-1,4,5,8-dimethano-1,2,3,4,4a,5,8,8a-thalene, 2-stearyl-8a-octahydronaphthalene, 2,3-dimethyl-1,4,5,8-dimethano-1,2,3,4,4a,5,8,8a-octahydronaphthalene, 2-methyl-3-ethyl-1,4,5,8-dimethano-1,2,3,4,4a,5,8,8a-octahydronaphthalene, 2-chloro-1,4,5,8-dimethano-1,2,3,4,4a,5,8,8a-octahydronaphthalene, 2-bromo-1,4,5,8-dimethanol,1,2,3,4,4a,5,8,8a-octahydronaphthalene, 2-cyclohexyl-1,4,5,8-dimethano-1,2,3,4,4a,5,8,8a-octahydronaphthalene, 2,3-dichloro-1,4,5,8-dimethanol,2,3,4,4a,5,8,8a-octahydronaphthalene, 2-cyclohexyl1,4,5,8-dimethano-1,2,3,4,4a,5,8,8a-octanydronaphthalene, 2-n-butyl-1,4,5,8-dimethanol,2,3,4,5,8,8a-octahydronaphthalene and 2-isobutyl1,4,5,8-dimethano-1,2,3,4,4a,5,8,8a-octahydronaphthalene, 9-isobutyl-11,12-dimethyl-3tetracyclo [4,4,0,1]-dodecene, 5,6,9,10tetramethyltetracyclo [4,4,0,1,1]-3-dodecene, hexacyclo [6,6,1,1,0,0]-4-heptadecene, 12-methylhexacyclo [6,6,1,1,0,0]-4-heptadecene, 12-ethylhexacyclo [6,1,1,1,0,0]-4-heptadecene, 12-isobutylhexacyclo [6,6,1,1,0,0]-4-heptadecene, 1,6,10-trimethyl-12-isobutylhexacyclo [6,6,1,1,0,0]-4-4-heptadecene, octacyclo[8,8,1,1,1,1,0,0,0]-5-dococene, 15-methyloctacyclo [8,8,1,1,1,1,0,0,0]-5-dococene, 5,10-dimethyltetracyclo[[4,4,0,1,1]-3-dodecene, 2,10dimethyltetracyclo [4,4,0,1,1]-3-dodecene, 11,12dimethyltetracyclo [4,4,0,1,1]-3-dodecene, 2,7,9trimethyltetracyclo [4,4,0,1,1]-3-dodecene, 9-ethyl-2,7dimethyltetracyclo [4,4,0,1,1]-3-dodecene, 9-isobutyl-2,7-dimethyltetracyclo [4,4,0,1,1]-3-dodecene, 9,11,12trimethyltetracyclo [4,4,0,1,1]-3-dodecene, 9-ethyl-11,12-dimethyltetracyclo [4,4,0,1,1]-3-dodecene, 15ethyloctacyclo [8,8,1,1,1,0,1,0]-5-dococene, and compounds shown in Table 1.

TABLE 1

| Chemical Formula | Examples of Cyclic Olefin Compound Name |
|---|---|
| (structure, numbered 1–13) | pentacyclo[7.4.0.1$^{2,5}$.0$^{8,13}$.1$^{9,12}$]pentadecene-3 |
| (structure with CH$_3$) | methyl-pentacyclo[7.4.0.1$^{2,5}$.0$^{8,13}$.1$^{9,12}$]pentadecene-3 |
| (structure with CH$_3$ CH$_3$) | dimethyl-pentacyclo[7.4.0.1$^{2,5}$.0$^{8,13}$.1$^{9,12}$]pentadecene-3 |
| (structure with CH$_3$ CH$_3$ CH$_3$) | trimethyl-pentacyclo[7.4.0.1$^{2,5}$.0$^{8,13}$.1$^{9,12}$]pentadecene-3 |
| (structure, numbered 1–17) | heptacyclo[8.7.0.0$^{2,7}$.1$^{3,6}$.1$^{10,17}$.0$^{11,16}$.1$^{12,15}$]eicosene-4 |
| (structure with CH$_3$) | methyl-heptacyclo[8.7.0.0$^{2,7}$.1$^{3,6}$.1$^{10,17}$.0$^{11,16}$.1$^{12,15}$]eicosene-4 |

TABLE 1-continued

Examples of Cyclic Olefin

| Chemical Formula | Compound Name |
|---|---|
| (structure with CH₃ CH₃) | dimethyl-heptacyclo[8.7.0.0$^{2,7}$.1$^{3,6}$.1$^{10,17}$.0$^{11,16}$.1$^{12,15}$]eicosene-4 |
| (structure with CH₃ CH₃ CH₃) | trimethyl-heptacyclo[8.7.0.0$^{2,7}$.1$^{3,6}$.1$^{10,17}$.0$^{11,16}$.1$^{12,15}$]eicosene-4 |
| (structure with CH₃ CH₃ CH₃ CH₃) | tetramethyl-heptacyclo[8.7.0.0$^{2,7}$.1$^{3,6}$.1$^{10,17}$.0$^{11,16}$.1$^{12,15}$]eicosene-4 |
| (numbered structure) | nonacyclo[10.9.1.0$^{2,10}$.0$^{3,8}$.1$^{4,7}$.0$^{12,21}$.1$^{13,20}$.0$^{14,19}$.1$^{15,18}$]pentacosene-5 |

As examples of the compound represented by the general formula (II), there can be mentioned compounds shown in Table 2. The structure of the general formula (II) is formed by appropriately reacting a cyclic olefin with an aromatic olefin.

TABLE 2

| Chemical Formula | Compound Name [parenthesized compound is aromatic olefin to be reacted with cyclopentadiene] |
|---|---|
| (structure) | 5-phenyl-bicyclo[2,2,1]hept-2-ene (styrene) |
| (structure with CH₃) | 5-methyl-5-phenyl-bicyclo[2,2,1]hept-2-ene (α-methylstyrene) |
| (structure with CH₂) | 5-benzyl-bicyclo[2,2,1]hept-2-ene (allylbenzene) |
| (structure with CH₃) | 5-tolyl-bicyclo[2,2,1]hept-2-ene (methyl-substituted styrene) |
| (structure with CH₂CH₃) | 5-(ethylphenyl)-bicyclo[2,2,1]hept-2-ene (ethyl-substituted styrene) |
| (structure with CH(CH₃)₂) | 5-(isopropylphenyl)-bicyclo[2,2,1]hept-2-ene (isopropyl-substituted styrene) |
| (structure) | 1,4-methano-1,1a,4,4a-tetrahydrofluorene (indene) |
| (structure) | 1,4-methano-1,4,4a,5,10,10a-hexahydroanthracene (dihydronaphthalene) |
| (structure) | cyclopentadiene-acenaphthylene adduct (acenaphthylene) |
| (structure) | 5-(α-naphthyl)-bicyclo[2,2,1]hept-2-ene (vinylnaphthalene) |
| (structure) | 5-(anthracenyl)-bicyclo[2,2,1]hept-2-(2.)ene (vinylanthracene) |

The structure represented by the general form (III) can be easily formed by condensing a cyclopentadiene with a corresponding olefin by Diels-Alder reaction. As specific examples, there can be mentioned 1,3-dimethyl-pentacyclo[6,6,1,1,0,0]-4hexadecene, 1,6-dimethylpentacyclo[6,6,1,1,0,0]-4hexadecene, 15,16-dimethylpentacyclo[-6,6,1,1,0,0]-4hexadecene, pentacyclo[6,5,1,1,0,0]-4-pentadecene, 1,3dimethylpentacyclo [6,5,1,1,0,0]-4-pentadecene, 1,6dimethylpentacyclo [6,5,1,1,0,0]-4-pentadecene, 14,15dimethylpentacyclo [6,5,1,1,0,0]-4-pentadecene, pentacyclo[6,6,1,1,0,0]-4-hexadecene, pentacyclo [8,7,1,1,1,0,0,0]-5-icosene and pentacyclo [8,8,1,1,1,0,0,0]-5-heneicosene.

Ethylene and the above-mentioned cyclic olefin are used for the copolymer (c). In addition to these two indispensable components, other copolymerizable monomer can be used, so long as attainment of the objects of the present invention is not hindered. As specific examples, there can be mentioned 1-olefins having 3 to 20 carbon atoms, such as propylene, 1-butene, 4-methyl-1-pentene, 1-hexene, 1-octene, 1-decene, 1-dodecene, 1hexadecene, 1-octadecene and 1-eicosene. The monomer can be added in an amount smaller than the amount equimolar to the amount of the ethylene component in the random copolymer (c).

Furthermore, as the monomer, there can be mentioned cyclo-olefins such as cyclopentene, cyclohexene, 3-methyl-cyclohexene, cyclo-octene and 3a,5,6,7a-7-methano-1H-indene (structural formula:

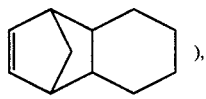), unconjugated dienes such as 1,4-hexadiene, 4-methyl-1,4-hexadiene, 5-methyl-1,4-hexadiene, 1,7-octadiene, dicyclopentadiene, 5-ethylidene-2-norbornene and 5-vinyl-2-norbornene, and norbornenes such as norbornene-2, 5-methylnorbornene-2, 5-ethylnorbornene-2, 5-isopropylnorborne-2,5-n-butylnorborne-2, 5-i-butylnorbornene-2, 5,6-dimethylnorbornene-2, 5-chloronorbornene-2, 2-fluoronorbornene-2 and 5,6-dichloronorbornene-2. The monomer can be added in an amount smaller than the amount equimolar to the amount of the cyclic olefin component int he random copolymer (c).

The cyclic olefin type random copolymer can be prepared by polymerizing he cyclic olefin and ethylene in a liquid phase composed of a hydrocarbionmedium in the presence of a catalyst formed from a soluble vanadium compound and an organic aluminum compound, as disclosed in Japanese Unexamined Patent Publication No. 61-272216.

In the obtained cyclic olefin type random copolymer, the ethylene/cyclic olefin molar ratio is generally in the range of from 99/1 to 1/99 and preferably a in the range of from 98/2 to 2/98. The cyclic olefin type random copolymer is non-crystalline or crystalline, but among cyclic olefin type random copolymers, a copolymer having no DSC melting point, which is judged to be non-crystalline by the X-ray diffractometric measurement, is preferably used. The glass transition temperature (Tg)(the loss elastic modulus E" is measured at a temperature-elevating rate of 1° C./min by DMA supplied by du Pont) of the cyclic olefin type random copolymer is 10° to 240° C., preferably 100° to 200° C.

It is preferred that the intrinsic viscosity ($\eta$) of the cyclic olefin type random copolymer, as measured at 135° C. indecalin as the solvent, be 0.02 to 1.5 dl/g, especially 0.04 to 1.2 dl/g. If the intrinsic viscosity ($\eta$) is lower than 0.02 dl/g, the hot-melt adhesive begins to flow at a high temperature and no good results can be obtained. If the intrinsic viscosity ($\eta$) is higher than 1.5 dl/g, the melt viscosity is high and the formability (workability) is degraded.

Preparation of Hot-Melt Adhesive Composition

The hot-melt adhesive composition of the present invention is prepared by blending 20 to 70 parts by weight of (a) a vinyl aromatic compound/conjugated diene copolymer or a hydrogenation product thereof, 30 to 80 parts by weight of (b) an alicyclic hydrocarbon resin tackifier the total amount of the components (a) and (b) being 100 parts by weight and 0.3 to 20 parts by weight of (c) a cyclic olefin type random copolymer.

The amount used of the component (a) is especially preferably 30 to 50 parts by weight. If the amount of the component (a) is smaller than 20 parts by weight, the adhesiveness of the hot-melt adhesive at a high temperature is reduced. On the other hand, if the amount of the component (a) is larger than 70 parts by weight, the viscosity of the hot-melt adhesive increases and the workability of the composition is degraded.

The amount used of the alicyclic hydrocarbon resin tackifier as the component (b) is especially preferably 50 to 60 parts by weight. If the amount of the component (b) is smaller than 30 parts by weight, the viscosity of the hot-melt adhesive composition increases and the workability is degraded. If the amount of the component is larger than 80 parts by weight, the adhesiveness of the hot-melt adhesive composition at a high temperature is lowered.

The amount used of the cyclic olefin type random copolymer as the component (c) is especially preferably 2 to 5 parts by weight. If the amount of the component (c) is smaller than 0.3 part by weight, the hot-melt adhesive composition is insufficient in the shear adhesion failure temperature. Namely, a prominent improvement of the adhesiveness at a high temperature or in a high-humidity atmosphere is not attained in the hot-melt adhesive composition. If the amount of the cyclic olefin type random copolymer is larger than 20 parts by weight, the viscosity of the hot-melt adhesive increases, and the hot-melt adhesive composition is not satisfactory in the workability and operation adaptability.

Accordingly, by incorporating the cyclic olefin type random copolymer in an amount of 0.3 to 20 parts by weight into the hot-melt adhesive composition of the present invention, the adhesiveness under heating at a high temperature by hot water or an electronic range or in a high-humidity atmosphere is especially highly improved. The adhesiveness to an adherend such as polyethylene, polypropylene, polyethylene terephthalate, urethane, ABS or polyvinyl chloride is particularly improved. A softener, a stabilizer, a filler and an antioxidant can be incorporated into the hot-melt adhesive composition of the present invention in addition to the above-mentioned indispensable components (a) through (c) according to need.

The hot-melt adhesive composition of the present invention can be prepared by supplying the components (a) through (c) and additives used according to need to a mixer such as a Brabender mixer, heating and melt-mixing them and forming the melt into a desirable shape such as a flake, a pellet, a rod or the like.

The obtained hot-melt adhesive composition is laminated on the surface of a sheet-shaped substrate such as a cloth or kraft paper to form an adhesive tape or label. For coating the composition on the surface of the substrate, extrusion coating or extrusion lamination can be performed after heat-melting the composition. If the substrate is composed of a thermoplastic resin, an adhesive film can be formed by co-extrusion of the composition and the thermoplastic resin. Moreover, since the composition has a certain cohesive force, the composition per se is formed into a sheet and the sheet can be used as a double-coated adhesive tape.

Since the hot-melt adhesive composition of the present invention comprises the cyclic olefin type random copolymer in addition to the vinyl aromatic compound/conjugated diene copolymer or the hydrogenation product thereof and the alicyclic hydrocarbon resin tackifier, the composition of the present invention has an excellent adhesiveness not only at a low temperature but also at a high temperature or in a high-humidity atmosphere.

EXAMPLE

The present invention will now be described in detail with reference to the following examples.

EXAMPLE 1

To a Brabender mixer were supplied 34.1 parts by weight of a hydrogenated styrene/butene copolymer (vinyl aromatic compound/conjugated diene weight ratio of 14/86; Kraton G-1657 supplied by Shell Chemicals) as the vinyl aromatic compound/conjugated diene compound copolymer (a), 65.9 parts by weight of a hydrogenated petroleum resin (Arkon P-100 supplied by Arakawa Kagaku) as the alicyclic hydrocarbon resin tackifier (b) (the total amount of the components (a) and (b) was 100 parts by weight) and 2.4 parts by weight of an ethylene/2-methyl-1,4,5,8-dimethanol-1,2,3,4,4$a$,5,8-,8$a$-octahydronaphtlene copolymer (amorphous copolymer; ethylene content was 63% as measured by $^{13}$C-NMR analysis; Tg was 150° C.; ($\eta$) was 0.10 dl/g) as the cyclic olefin type random copolymer (c), and they were heated and melt-mixed at 220° C. for 30 minutes at 500 rpm to form a hot-melt adhesive composition. This hot-melt adhesive composition was coated in a thickness of 50 μm on a polyethylene terephthalate (PET) film to prepare an adhesive tape. Draw polypropylene as heat-sealed to this film at 12020 C.

A load of 500 g was imposed on one film of the obtained laminate having a width of 25 mm and a height of 100 mm, and the temperature was elevated at a rate of 20° C./hour, and the temperature at which one film slipped off was measured as the shear adhesion failure temperature (ASTM D-816).

The obtained results are shown in Table 3.

Furthermore, the melt viscosity of the hot-melt adhesive composition at 180° C. was measured. The obtained results are shown in Table 3.

EXAMPLE 2

The procedures of Example 1 were repeated in the same manner except that the Kraton G-1657/Arkon P100/cyclic olefin type random copolymer weight ratio was changed to 34.9/65.1/4.8. The obtained results are shown in Table 3.

EXAMPLE 3

The procedures of Example 1 were repeated in the same manner except that a styrene/butadiene block copolymer (Cariflex TR110 supplied by Shell Chemicals) was used instead of Kraton G-1657 used in Example 1. the obtained results are shown in Table 3.

EXAMPLE 4

The procedures of Example 1 were repeated in the same manner except that the Kraton G-1657/Arkon P100/cyclic olefin type random copolymer weight ratio was changed to 50.5/49.5/0.8. The obtained results are shown in Table 3.

COMPARATIVE EXAMPLE 1

The procedures of Example 1 were repeated in the same manner except that the cyclic olefin type random copolymer was not added. The shear adhesion failure temperature of the obtained hot-melt composition as measured in the same manner as described in Example 1, and the melt viscosity at 180° C. was measured.

The obtained results are shown in Table 3.

COMPARATIVE EXAMPLE 2

A hot-melt adhesive composition as prepared in the same manner as described in Example 1 except that polyethylene oxide was used instead of the cyclic olefin type random copolymer (c) used in Example 1. In the same manner as described in Example 1, the shear adhesion failure temperature was measured, and the melt viscosity at 180° C. was measured.

The obtained results are shown in Table 3.

COMPARATIVE EXAMPLE 3

The procedures of Example 1 were repeated int he same manner except that he Kraton G-1657/Arkon 100/cyclic olefin type random copolymer weight ratio was changed 80/15/5.

The obtained results are shown in Table 3.

From the results as shown in Table 3, it is obvious that a hot-melt adhesive composition comprising (a) as vinyl aromatic compound/conjugated diene compound copolymer or a hydrogenation product thereof, (b) an alicyclic petroleum resin tackifier and (c) a cyclic olefin type random copolymer has an excellent adhesion even at a high temperature.

We claim:

TABLE 3

|  | Shear Adhesion Failure Temperature (°C.) | Melt Viscosity (cp, 180° C.) |
|---|---|---|
| Example 1 | 94 | 50,000 |
| Example 2 | 97 | 60,000 |
| Example 3 | 95 | 60,000 |
| Example 4 | 92 | 80,000 |
| Comparative Example 1 | 60 | 48,000 |
| Comparative Example 2 | 82 | 59,000 |
| Comparative Example 3 | 84 | 100,000 |

1. A hot-melt adhesive composition comprising (a) 20 to 70 parts by weight of a vinyl aromatic compound/conjugated diene copolymer or a hydrogenation product thereof, (b) 30 to 80 parts by weight of an alicyclic hydrocarbon resin tackifier, the total amount of the components (a) and (b) being 100 parts by weight, and (c) 0.3 to 20 parts by weight of a random copolymer of a cyclic olefin and ethylene.

2. A hot-melt adhesive composition as set forth in claim 1, wherein the cyclic olefin used for the random copolymer (c) is a member selected from the group consisting of compounds represented by the following formula (I):

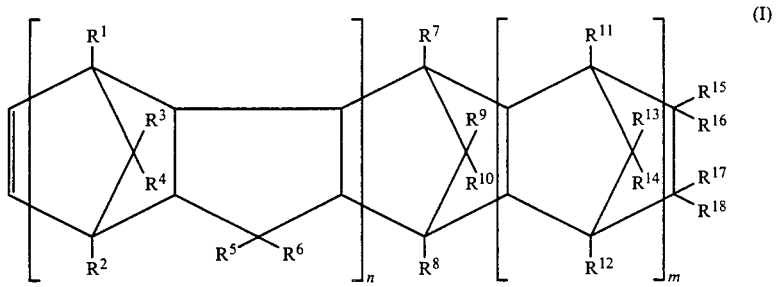

(I)

wherein n is 0 or 1, m is 0 or a positive integer, $R^1$ through $R^{18}$ independently represent a hydrogen atom, a halogen atom or a hydrocarbon group, $R^{15}$ through $R^{18}$ may be bonded together to form a monocyclic or polycyclic group, the monocyclic or polycyclic group may have a double bond, and $R^{15}$ and $R^{16}$ or $R^{17}$ and $R^{18}$ may form an alkylidene group, compounds represented by the following formula (II):

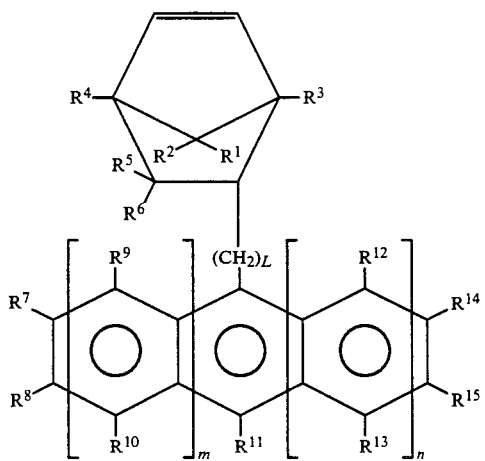

(II)

wherein L is o or an integer of at least 1, m and n represent 0,1 or 2, $R^1$ through $R^{15}$ independently represent a hydrogen atom, a halogen atom, an aliphatic hydrocarbon group, an aromatic hydrocarbon group or an alkoxy group, and $R^5$ (or $R^6$) and $R^9$ (or $R^7$) may be bonded together through an alkylene group or directly without any intervening group,
and compounds represented by the following formula (III):

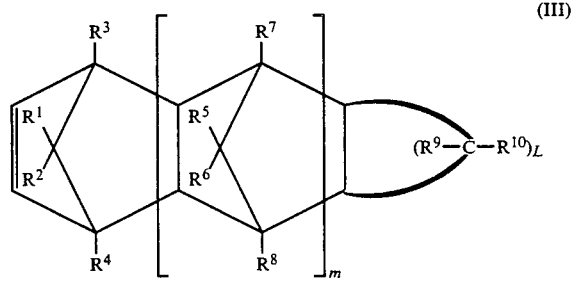

(III)

wherein m is a positive integer, L is an integer of at least 3, and $R^1$ through $R^{10}$ independently represent a hydrogen atom, a halogen atom or a hydrocarbon group.

3. An adhesive composition as set forth in claim 1, wherein the cyclic olefin used for the random copolymer (c) is an octahydronaphthalene.

4. An adhesive composition as set forth in claim 1, wherein the glass transition temperature (Tg) of the random copolymer (c) is 100° to 200° C.

5. An adhesive composition as set forth in claim 1, wherein the intrinsic viscosity (η) of the random copolymer (c) measured at 135° C. in decalin as the solvent is 0.02 to 1.5 dl/g.

6. An adhesive composition as set forth in claim 1, wherein in the vinyl aromatic compound/conjugated diene copolymer or the hydrogenation product thereof (a), the vinyl aromatic compound is selected from the group consisting of styrene, α-methylstyrene, vinyltoluene, p-tert-butylstyrene, vinylxylene, ethylvinylxylene and vinylnaphthalene, and the conjugated diene is a member selected from the group consisting of 1,3-butadiene, derivatives thereof.

7. An adhesive composition as set forth in claim 6, wherein the vinyl aromatic compound/conjugated diene copolymer (a) is selected from the group consisting of a styrene/isoprene random copolymer, a styrene/butadiene random copolymer, a butadiene/polystyrene block copolymer, a styrene/isoprene block copolymer and an α-methylstyrene/butadiene/α-methylstyrene block copolymer.

8. An adhesive composition as set forth in claim 2, wherein the alicyclic hydrocarbon resin tackifier (b) has a softening point of from 80° to 140° C.

9. A sticking structure comprising a sheet-shaped substrate and an adhesive layer formed on the surface of the substrate, wherein the adhesive layer comprises (a) to 70 parts by weight of a vinyl aromatic compound-/conjugated diene copolymer or a hydrogenation product thereof, (b) 30 to 80 parts by weight of an alicyclic hydrocarbon resin tackifier, the total amount of the components (a) and (b) being 100 parts by weight, and (c) 0.3 to 20 parts by weight of a random copolymer of a cyclic olefin and ethylene.

10. A sticking structure as set forth in claim 9, wherein the cyclic olefin used for the random copolymer (c) is a member selected from the group consisting of compounds represented by the following formula (I):

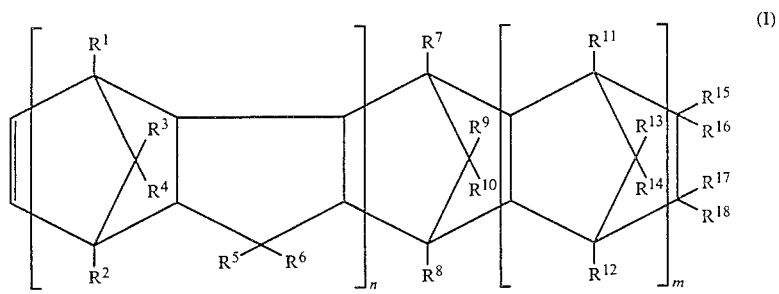
(I)

wherein n is 0 or 1, m is 0 or a positive integer, $R^1$ through $R^{18}$ independently represent a hydrogen a halogen atom or a hydrocarbon group, $R^{15}$ through $R^{18}$ may be bonded together to form a monocyclic or polycyclic group, the monocyclic or polycyclic group may have a double bond, and $R^{15}$ and $R^{16}$ or $R^{17}$ and $R^{18}$ may form an alkylidene group, compounds represented by the following formula (II):

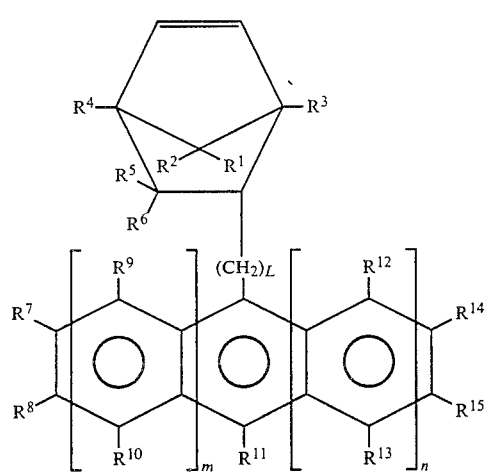
(II)

wherein L is 0 or an integer of at least 1, m and n represent 0, 1 or 2, $R^1$ through $R^{15}$ independently represent a hydrogen atom, a halogen atom, an aliphatic hydrocarbon group, an aromatic hydrocarbon group or an alkoxy group, and $R^5$ (or $R^6$) and $R^9$ (or $R^7$) may be bonded together through an alkylene group or directly without any intervening group, and compounds represented by the following formula (III):

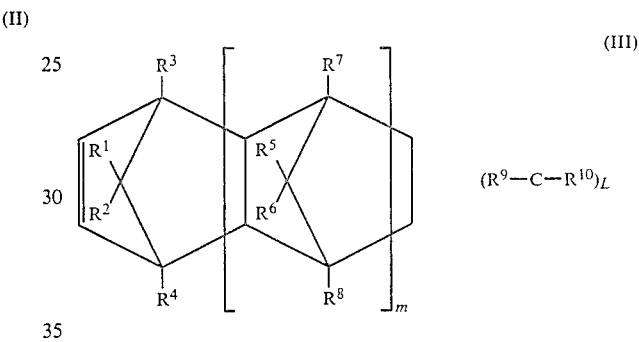
(III)

$(R^9-C-R^{10})_L$ wherein m is a positive integer, L is an integer of at least 3, and $R^1$ through $R^{10}$ independently represent a hydrogen atom, a halogen atom or a hydrocarbon group.

11. A sticking structure as set forth in claim 9, wherein the cyclic olefin used for the random copolymer (c) is an octahydronaphthalene.

* * * * *